March 16, 1926. 1,577,135
J. C. MacLACHLAN
DEVICE FOR REDUCING FLUID MATERIALS TO POWDERED FORM
Original Filed March 19, 1919 2 Sheets-Sheet 1
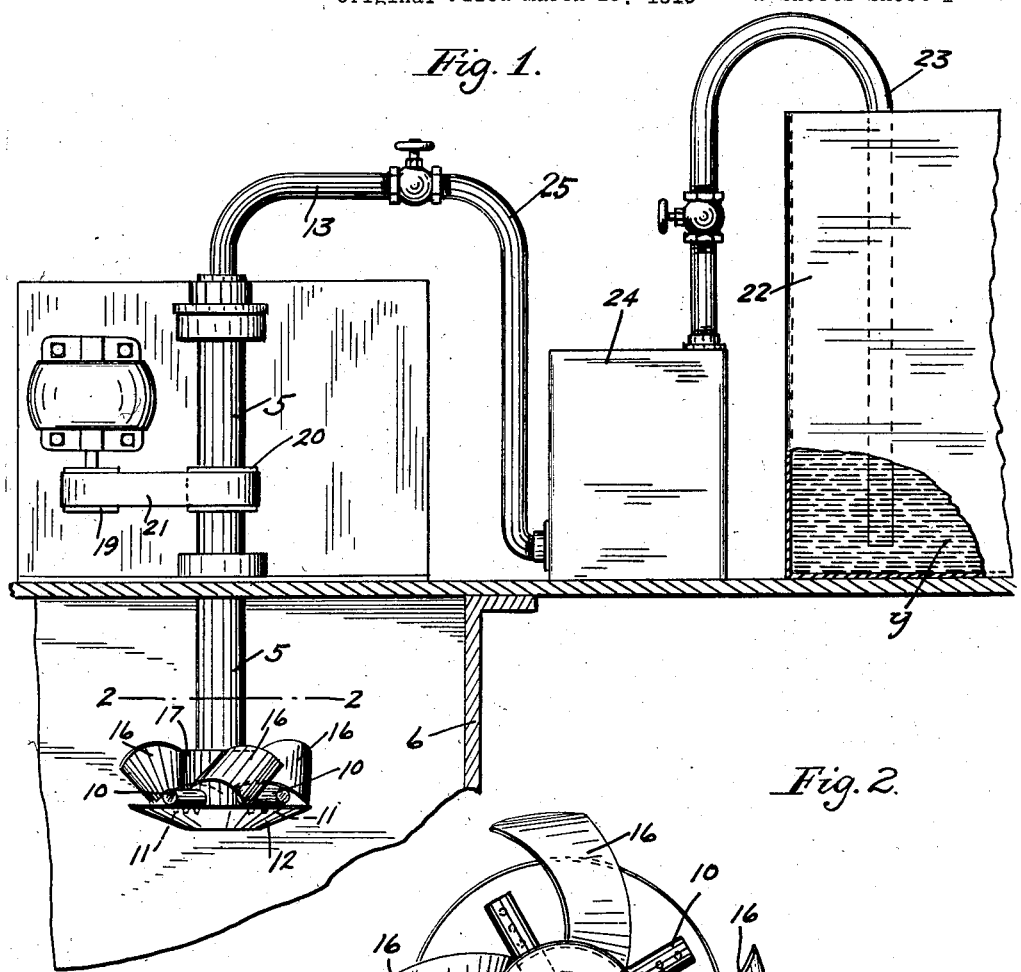
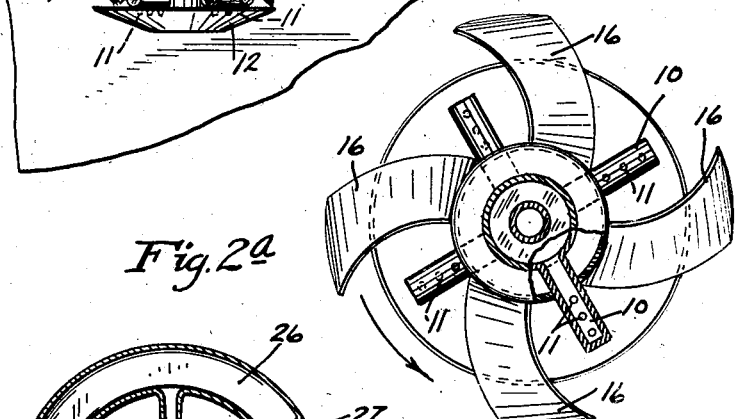
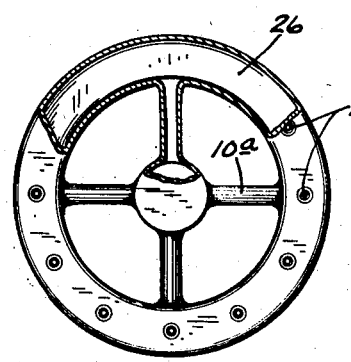
Inventor
JOHN C. MacLACHLAN
By his Attorneys
Williamson & Merchant March 16, 1926.　　　　　　　　　　　　　　1,577,135
J. C. MacLACHLAN
DEVICE FOR REDUCING FLUID MATERIALS TO POWDERED FORM
Original Filed March 19, 1919　　2 Sheets-Sheet 2

Inventor
JOHN C. MacLACHLAN
By his Attorneys

Patented Mar. 16, 1926.

1,577,135

UNITED STATES PATENT OFFICE.

JOHN C. MacLACHLAN, OF CHICAGO, ILLINOIS, ASSIGNOR, BY MESNE ASSIGNMENTS, TO PURE PRODUCTS COMPANY, OF CHICAGO, ILLINOIS, A CORPORATION OF ILLINOIS.

DEVICE FOR REDUCING FLUID MATERIALS TO POWDERED FORM.

Application filed March 19, 1919, Serial No. 283,587. Renewed November 28, 1924.

*To all whom it may concern:*

Be it known that I, JOHN C. MACLACHLAN, a citizen of the United States, residing at Chicago, in the county of Cook and State of Illinois, have invented certain new and useful Improvements in a Device for Reducing Fluid Materials to Powdered Form; and I do hereby declare the following to be a full, clear, and exact description of the invention, such as will enable others skilled in the art to which it appertains to make and use the same.

This invention relates to the reduction of fluid, semi-fluids, and like substances, to dry, finely divided powdered form, and particularly has for its object to provide an improved form of spraying head for reducing eggs to wit, the white and yolk or the separated white and yolk to dry powdered form.

In my prior Patent No. 1,301,288, of April 22, 1919, entitled "Apparatus for granulating semi-fluid materials," I disclose an apparatus for granulating such materials, including an improved form of spraying head, whereby the fluid or pasty material is beaten in the presence of the hot drying medium, and such beating action I have found to be essential for some purposes, and highly desirable for other purposes. However, experience has shown that this beating action is not desirable in the reduction of eggs to dry powdered form because such beating action seems to break up the globules and therefore not produce the best possible product.

The present application, therefore, is directed to an improved form of spraying head from which the egg substance is thrown by centrifugal force into the hot drying medium and, simultaneously, is subjected to a blast of air produced by blades or fan elements carried by or closely associated with the spraying head, but without, however, subjecting the egg substance to any beating action.

The present invention is illustrated in the accompanying drawings wherein like characters indicate indicate like parts throughout the several views. Referring to the drawings:—

Fig. 1 is a view partly in side elevation and partly in section and with some parts broken away, showing the improved spraying head and certain associated devices for the delivery of the fluid substance to the head;

Fig. 2 is a horizontal section on the line 2—2 of Figs. 1 and 3, some parts being broken away;

Figure 3:
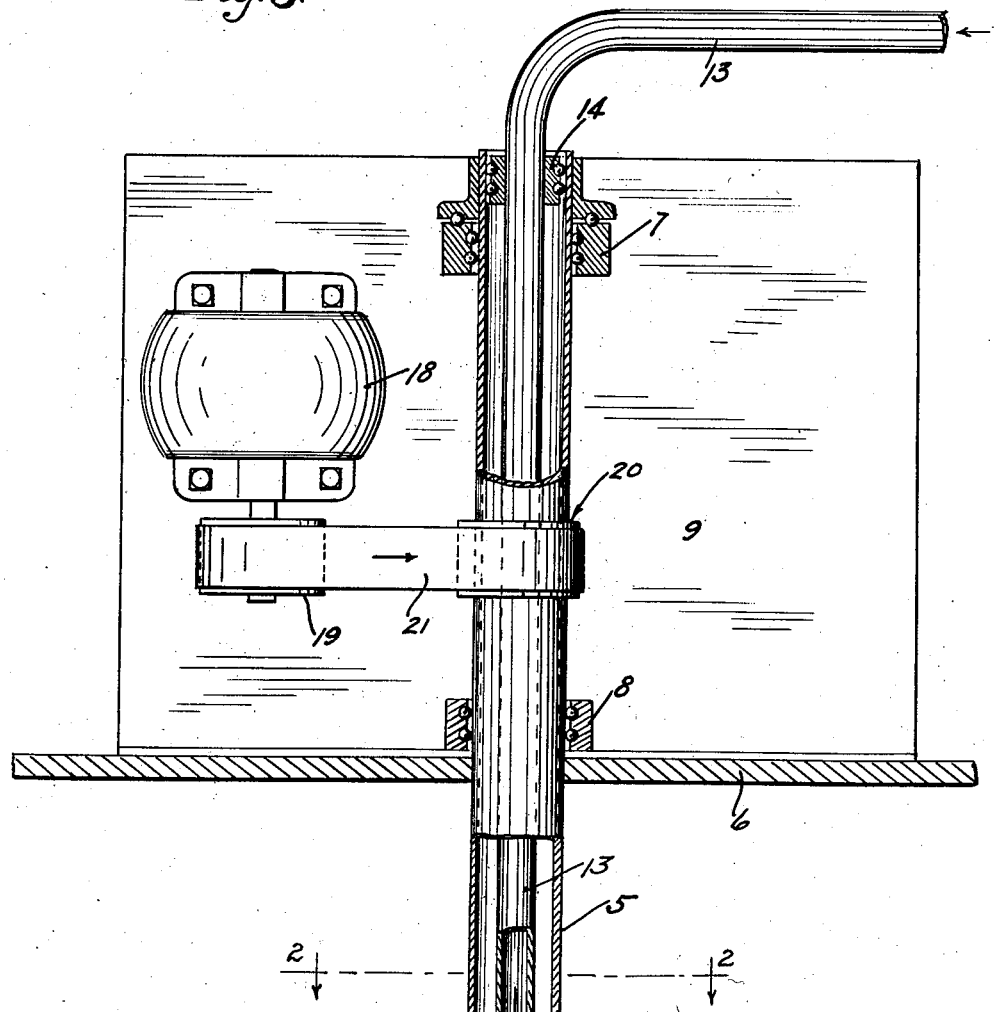
Figure 4:
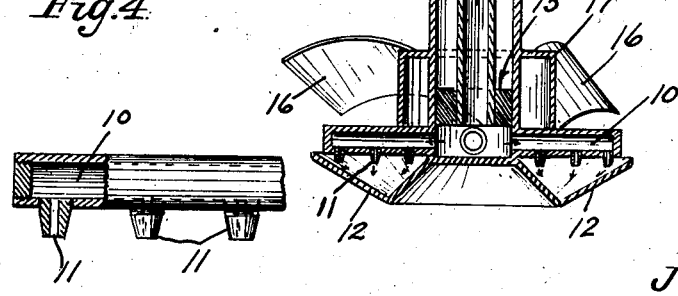

Fig. 2ª is a bottom plan view showing a somewhat modified form of the nozzle portion of the spraying head;

Fig. 3 is a view in elevation showing the spraying head and its carrying spindle and associated devices, chiefly in vertical section but with some parts in full; and Fig. 4 is a fragmentary view showing one of the radial tubes of the spraying nozzle.

The spraying head has a tubular vertically extended stem 5, the lower end of which extends downward into the housing or hot air chamber 6, and the upper portion of which extends above the top of said housing and, by means of upper and lower branches 7 and 8, both of which are preferably of the ball bearing type, is supported for rotary movements on the vertical axis. The fixed portions of the bearings 7 and 8 are shown as applied to a support 9 on the top of the housing 6. The lower end of the tubular stem 5 is closed, but adjacent to its lower end, it is provided with a plurality of radial tubular arms or nozzle tubes 10. In the construction illustrated in Figs. 1, 2, 3 and 4, the outer ends of the nozzle tubes 10 are closed and the said tubes are provided with small depending discharge nipples 11 that overlie an annular spraying flange or plate 12 secured to the lower end of the rotary spindle 5. This so-called spraying flange is preferably made concavo-convex in radial section, as best shown in Fig. 3, which view, however, shows the concavity greater than that usually given thereto in practice. The purpose of the concavity is to give good clearance for the delivery of the egg substance from the nipples onto the said spraying flange, and it is important to note that the outer edge of said spraying flange extends to a plane that is slightly above the lower ends of the said nipple 11, so that under the action of centrifugal force, the egg substance will always be thrown onto the said flange.

The egg substance or fluid will be delivered to the lower end of the spindle 5, through a delivery pipe 13 that extends downward through said spindle and leads from a suitable source of supply. As shown, the upper part of the vertical portion of the pipe 13 is centered in the upper end of the rotary spindle 5, by a ball bearing 14. Secured within the lower end portion of the spindle 5 and rotating on the lower end of the pipe 13 is a bushing 15 that closes the annular passage between the spindle and pipe. Preferably this bushing bearing 15 is made of wood and it must be located above the inner ends of the nozzle pipes 10, so as to keep open the path of communication between the pipe 13 and the said nozzle tubes.

Just above the nozzle tubes 10, the spindle 5 is provided with a plurality of fan blades 16 shown as secured to an enlargement 17 of the spindle. These blades 16 are so formed that when the spraying head is rotated in the direction of the arrow marked on Fig. 2, said blades produce a strong downward blast of air directly onto the upper surface of the spraying flange 12 and directly downward immediately outward of the peripheral edge of said flange. The importance of this will be considered in the description of the operation.

For rotating the spindle and the entire spraying head, a small electric motor 18 is shown as secured on the support 9 and its armature shaft is shown as provided with a pulley 19 over which and a pulley 20 on the rotary spindle 5 runs a belt 21. In practice, the spraying head will be driven at a high speed, preferably about 5000 revolutions per minute.

In the apparatus illustrated, the egg substance y which will contain either the white or yolk of the eggs, or both, may be placed in a tank 22 and a pipe 23 will extend from the bottom of this tank to a suitable pump 24 diagrammatically indicated in Fig. 1. This pump will deliver the egg substance under pressure to the pipe 13, through a similar pipe 25.

In the modified form of nozzle illustrated in Fig. 2ª, the radial nozzle pipes 10ª are like the pipes 10, except that they are not provided with nipples, but at their outer ends are connected to an annular or endless nozzle tube 26 that is provided with a plurality of circumferentially spaced depending discharge nipples 27 that should be on a circumferential line inward of the periphery of the spacing flange 12.

This spraying head or device, like that of my prior patent above identified, will be arranged to deliver into the upper portion of a drying chamber through which hot air or other hot drying material will preferably be circulated in an upward direction.

When this spraying head is rotated at high speed, as stated, and the egg substance is delivered thereto under pressure, such egg substance will be discharged from the nipples of the spraying nozzle directly above the so-called spraying flange 12 and, by the action of centrifugal force, will be thrown from the periphery of said flange at great velocity and in finely divided form. This spraying action is rendered much more complete and effective by the downward blast of air produced by the fan blades 16, which blow a downward blast, as already stated. The downward blast, in the first instance, assists in spreading the liquid or semi-liquid egg substance over the spraying flange and causes the same to adhere thereto until it reaches the periphery of said flange, and then, as the egg substance is thrown from the periphery of the flange, this same downward blast of air which acts just outward of the said flange gives a downward impulse to the material thrown from the flange and thus tends to produce a downward umbrella-shaped shower of very finely divided and substantially atomized liquid or semi-liquid which, in this finely divided form, is rapidly converted into dry finely divided or powdered form by the hot air or drying material into which it is projected. The egg substance thus treated by the time it drops to the bottom of the drying chamber will be in dry powdered form.

The above described spraying head, to date, has been found the most efficient for converting egg substances into powdered form, but may be found equally desirable for reducing other substances to powdered or finely divided dry form.

I have also found that the improved device above described is especially well adapted for reducing to powdered form, milk and cream which both have fat globules that should not be broken up.

What I claim is:

1. A rotary spraying head adapted to be disposed in a hot air chamber having in combination, a lower outwardly and upwardly flaring discharge member, a plurality of downwardly curved fan blades disposed thereabove and extending beyond the edge thereof in proximity thereto, adapted to direct a blast of air downwardly about the edge of said member, and a delivery member for said discharge member located between said flaring member and fan blades comprising a plurality of radial arms with downwardly extending outlet portions, which portions extend below the edge of the flaring member.

2. A rotary spraying head adapted to rotate in a hot air chamber, having in combination an inverted conical disk discharge member, a plurality of downwardly and forwardly curved fan blades extending beyond the periphery of said disk member and adapted to direct a current of air downwardly about the edge of the same, and a delivery device for said discharge member located between the disk member and fan blades comprising a plurality of radially extending hollow arms, a central chamber communicating therewith, and a plurality of downwardly extending nipples carried by each of said arms, the lower end of said nipples extending below the upper edge of the conical disk.

3. In an apparatus of the kind described, a hot air chamber, an upright tubular spindle extended downward into said chamber and connected to a source of supply of the material to be reduced to a dry finely divided form, and an inverted conical member carried by and receiving the material from the lower end of the spindle, a fan having spaced blades carried by said spindle, said blades being curved and disposed immediately above the edge of said member, and radial distributing members through which the material is discharged from said spindle to said member disposed between the blades of said fan.

In testimony whereof I affix my signature.

JOHN C. MacLACHLAN.